United States Patent Office 3,235,618
Patented Feb. 15, 1966

3,235,618
ISOMERIZATION PROCESS
John Happel, Hastings on Hudson, Charles J. Marsel, Flushing, and Joachim H. Blanck, Bronx, N.Y., assignors, by mesne assignments, to National Lead Company, New York, N.Y., a corporation of New Jersey
No Drawing. Filed Oct. 2, 1962, Ser. No. 227,714
9 Claims. (Cl. 260—678)

This invention relates to a process for the vapor phase isomerization of allene to methyl acetylene.

In the following specification the term "conversion" is intended to refer to the number of moles of allene reacted per mole of allene fed, the term "selectivity" to the moles of methyl acetylene produced per mole of allene reacted, and the term "yield" to the moles of methyl acetylene produced per mole of allene fed.

It is known to isomerize allene to methyl acetylene by contacting the former in the vapor phase and at elevated temperature with a silica-alumina catalyst activated with fluorine, hydrogen fluoride or other inorganic fluoride. This procedure is subject to the difficulties inherent in handling the various toxic and corrosive fluoride materials including HF.

It is among the objects of the present invention to provide a relatively simple process for isomerizing allene to methylacetylene which provides improved yields of methyl acetylene product, which secures increased catalyst life and which does not necessitate the use of highly corrosive and toxic catalyst activators.

Other objects and advantages of the present invention will be apparent from the following detailed description thereof.

In accordance with the invention, a process for the isomerization of allene to methyl acetylene is provided, which involves contacting allene in the vapor phase at a temperature of from about 150° to 410° C. with an alumina catalyst activated with a halocarbon activator having the formula $C_nH_xHAL_yF_z$, wherein HAL is a halogen radical, $n$ is an integer from one to four, $x$ is an integer from zero to nine, $y$ is an integer from zero to nine and $z$ is an integer from one to ten. The halogen radical may be either chlorine, bromine or iodine.

The activated alumina catalyst employed in the isomerization process is prepared by contacting an alumina catalyst with the aforesaid halocarbon at a temperature sufficiently high to cause the halocarbon to decompose on contacting the alumina catalyst particles. In this manner an activated isomerization catalyst is produced having a relatively long catalyst life, which may be readily reactivated by further treatment with the halocarbon activator. Moreover, the use of the thus resulting activated catalyst provides relatively high yields of the methyl acetylene and conversions of the allene reacted.

The alumina catalyst to be activated need not be a specially prepared or highly purified activated alumina. It has been found that commercially available activated aluminas provide highly active catalysts for allene isomerization.

Preferred halocarbon activators include fluoroform, tetrafluoromethane, dichlorodifluoromethane, bromotrifluoromethane, chlorodifluoromethane, 1,2-dichlorotetrafluoroethane and bromotrifluoroethane. While the activating temperature required to decompose the halocarbon employed depends upon the particular halocarbon, it has been found that, employing the above compounds, activating temperatures of from about 350° to about 850° C. are suitable. The activation treatment is preferably continued until free chlorine, bromine or iodine is recovered from the gaseous effluent from the activation reaction mixture, although shorter activating periods can produce catalysts having sufficiently high isomerization activities. It has been found that generally from about 1 to 20 minutes are required to effect activation of alumina catalysts with the above typical halocarbon activators at the indicated activation temperatures.

Preferably, a catalyst chamber is initially loaded with granular or pelleted alumina admixed with an inert, heat stabilizing material such as quartz. Other inert, solid diluents which may be used in place of quartz include, for example, porcelain, corundum, and the like. In the absence of an inert diluent, undesirable cracking of the hydrocarbon feed tends to occur. The catalyst is then activated by passing the aforesaid halocarbon activator over it at a temperature sufficient to decompose the halocarbon. The activator is admitted, in the case of gases, under its own cylinder pressure, either alone or diluted with an inert gas such as nitrogen. Liquid activators are admitted to the catalyst chamber by bubbling an inert gas through them, the resulting vapor mixture being carried into contact with the heated alumina catalyst.

A similar technique is employed to reactivate an alumina catalyst after it has become deactivated through extended or improper use. The reactivation is carried out as a separate cycle in the manner described above, or it may be part of a regeneration cycle during which air or other oxidizing vapor is fed into the catalyst chamber to decarbonize the catalyst. When reactivated in the latter manner, the halocarbon activator is fed to the catalyst chamber alone, or in admixture with the regenerating gases, the temperature of regeneration usually being sufficient to effect decomposition of the halocarbon in the presence of the alumina catalyst. If necessary, heat is added to effect decomposition of the activator.

The isomerization may be carried out with a feed stock of pure allene or with a feed stock containing allene in addition to other low molecular weight hydrocarbons, such as may be present in reaction mixtures formed during the production of allene. The activated catalyst, prepared as described above, is contacted with the vaporous feed stock at a temperature of from about 150° to about 410° C. It has been found that, when the isomerization is carried out at temperatures below about 150° C., relatively little conversion of the allene occurs, whereas when temperatures above about 410° C. are employed, the conversion is substantially complete but results in the production of contaminated end products. Preferably, the isomerization reaction is carried out at temperatures of from about 200° to about 400° C., at which the most satisfactory results have been obtained. The isomerization is ordinarily carried out at about atmospheric pressure.

The gaseous isomerization mixture is caused to flow over the catalyst at a space velocity preferably ranging from about 50 volumes of vapor flowed per hour per volume of catalyst space, to about 1000 volumes of vapor flowed per hour per volume of catalyst space, measured at S.T.P. (0° C., one atmosphere pressure). The space velocities utilized vary directly with the temperature of the reaction, the higher space velocities within the indicated range being employed at the higher isomerization reaction temperatures.

The following examples illustrate specific embodiments of the allene isomerization process of the present invention; it will be understood the examples are given for illustrative purposes and that the invention is not limited thereto.

A mixture of equal parts, by volume, 42.4 grams of activated alumina granules (commercial grade F-10—Aluminum Corp. of America) and 68.9 grams quartz chips was prepared in each of the following examples. 100 cc. of each mixture thus produced was loaded into a catalyst chamber and heated to a temperature sufficient to decompose the halocarbon activator thereafter added thereto. Gaseous activators were fed to the catalyst chamber under their own pressures, and liquid activators were fed in nitrogen streams bubbled therethrough. The activating procedure was carried out for a 10 minute period at atmospheric pressure.

Thereafter, allene was passed over the resulting activated catalyst at atmospheric pressure and methyl acetylene thereby produced. The following table identifies the activated catalyst employed, the temperature of the activation, the isomerization reaction conditions and the production of methyl acetylene therefrom in each of a series of runs.

| Example | I | II | III | IV | V | VI |
|---|---|---|---|---|---|---|
| Catalyst Activator | $CCl_2F_2$ | $CHClF_2$ | $C_2Cl_2F_4$ | $CF_4$ | $CHF_3$ | $C_2H_2BrF_3$ |
| Activation Temperature, °C | 460 | 565 | 560 | 595 | 650 | 600 |
| Isomerization Temperature, °C | 280 | 350 | 345 | 325 | 355 | 365 |
| Space Velocity (Volume of vapor flowed per hour per volume of catalyst space) | 165 | 165 | 165 | 165 | 165 | 165 |
| Percent conversion | 47.8 | 81.1 | 78.2 | 79.2 | 80.1 | 77.7 |
| Percent selectivity | 84.8 | 82.7 | 78.2 | 83.1 | 87.2 | 91.4 |
| Percent yield | 40.5 | 67.1 | 61.2 | 65.8 | 69.8 | 71.0 |

Example VII

The activated catalyst prepared in Example I above was reactivated after a number of isomerization cycles in the following manner.

After regeneration with nitrogen and air to burn off the carbonaceous deposit formed on the catalyst additional dichlorodifluoromethane was admitted to the catalyst chamber under the same conditions employed during the initial activation. Upon repeating the allene isomerization at a temperature of 280° C. and a space velocity of 165 volumes of vapor per hour per volume of catalyst space, 58.4% of the allene was reacted, and the selectivity and yield of methyl acetylene were 94.3% and 55%, respectively.

Example VIII

A catalyst similar to the catalyst employed in Example III above was prepared by activating alumina granules by passing a mixture of 90% air and 10% 1,2-dichlorotetrafluoroethane thereover at a temperature of 525° C. Upon passing allene over this activated catalyst at a temperature of 380° C. employing a space velocity of 165 volumes of vapor flow per hour per volume of catalyst space, the allene was 83.5% reacted, and methyl acetylene was produced with a selectivity of 70.7% and a yield of 59%.

Example IX

An activated catalyst similar to that employed in Example I above was utilized to isomerize allene at a temperature of 210°, employing a space velocity of 165 volumes of vapor flow per hour per volume of catalyst space; under these isomerization conditions the allene was 20.8% reacted and methyl acetylene was produced with a selectivity of 82.0% and a yield of 17.1%.

When the isomerization reaction temperature was increased to 430° C., the allene was 100% reacted but the selectivity and yield of methyl acetylene were negligible.

Example X

An activated catalyst similar to that employed in Example I above was utilized to isomerize allene at a temperature of 210° C., employing a space velocity of 825 volumes of vapor flow per hour per volume of catalyst; under such conditions the allene was 13.5% reacted and methyl acetylene was produced with a selectivity of 85.7% and a yield of 11.7%.

When the space velocity was decreased to 165 volumes per volume per hour and the reaction was carried out at the same temperature, the conversion of allene was 20.8% and the selectivity and yield of methyl acetylene were 82.0% and 17.1%, respectively.

Example XI

An activated catalyst similar to that employed in Example I above was utilized to isomerize an allene-hydrocarbon mixture containing the following components:

| Component: | Mole percent |
|---|---|
| Propane | 30.8 |
| Propylene | 6.1 |
| Allene | 40.6 |
| Methyl acetylene | 20.9 |
| Methane | 0.2 |
| N-butane | 0.8 |
| Isobutane | 0.6 |

When the reaction was carried out at a temperature of 280° C. and the vapor mixture was passed over the catalyst at a rate of 165 volumes per volume of catalyst per hour, the conversion of allene was 44.3%, and the selectivity and yield of methyl acetylene were 83.9% and 37.2%, respectively.

The present invention thus provides a process for isomerizing allene, which provides relatively high yields of methyl acetylene, and which process does not entail handling of toxic or corrosive catalyst activators. Since certain changes may be made in the above process without departing from the scope of the invention, it is intended that all matter contained in the above description shall be interpreted as illustrative and not in a limiting sense.

What is claimed is:

1. A process for the isomerization of allene to methyl acetylene, which comprises contacting allene in the vapor phase at a temperature of from 150° to 410° C. with an alumnia catalyst activated by decomposing a halocarbon having the formula $C_nH_xHAL_yF_z$, wherein HAL is a halogen radical, $n$ is an integer from one to four, $x$ is an integer from zero to nine, $y$ is an integer from zero to nine and $z$ is an integer from one to ten, in the presence of said alumina catalyst.

2. The process as defined in claim 1, in which the isomerization reaction is carried out at a temperature of from 200° to 400° C. and the reaction vapors are flowed over the activated catalyst at a space velocity of from 50 to 1,000 volumes of vapor per hour per volume of catalyst space.

3. The process as defined in claim 1, in which said halocarbon activator is a compound selected from the group consisting of fluoroform, tetrafluoromethane, dichlorodifluoromethane, bromotrifluoromethane, chlorodifluoromethane, 1,2-dichlorotetrafluoroethane and bromotrifluoroethane.

4. The process as defined in claim 1, in which said halocarbon is fluoroform.

5. The process as defined in claim 1, in which said halocarbon is tetrafluoromethane.

6. The process as defined in claim 1, in which said halocarbon is bromotrifluoroethane.

7. The process as defined in claim 1, in which said halocarbon is 1,2-dichlorotetrafluoroethane.

8. The process as defined in claim 1, in which said halocarbon is chlorodifluoromethane.

9. In a cyclic vapor phase process for the isomerization of allene to methyl acetylene which comprises the steps of contacting allene in the vapor phase at a temperature of from 150° to 410° C. with an activated alumina catalyst, regenerating the alumina catalyst to remove carbonaceous material therefrom and periodically reactivating said catalyst, the improvement which comprises activating and reactivating the alumina catalyst by decomposing a halocarbon having the formula $$C_nH_xHAL_yF_z$$

wherein HAL is a halogen radical, $n$ is an integer from one to four, $x$ is an integer from zero to nine, $y$ is an integer from zero to nine and $z$ is an integer from one to ten, in the presence of said alumina catalyst at a temperature of from 350° to 850° C.

References Cited by the Examiner

UNITED STATES PATENTS 2,594,706  4/1952  Allan _____ 260—678

FOREIGN PATENTS 1,299,388  6/1962  France.

ALPHONSO D. SULLIVAN, *Primary Examiner.*